United States Patent
Bickle et al.

(10) Patent No.: US 7,249,890 B2
(45) Date of Patent: Jul. 31, 2007

(54) FRICTION BEARING COMPOSITE MATERIAL WITH A METAL BASE LAYER

(75) Inventors: Wolfgang Bickle, Reilingen (DE); Werner Schubert, Wiesloch (DE); Thomas Storch, Bruehl (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 596 days.

(21) Appl. No.: 10/475,309

(22) PCT Filed: May 31, 2002

(86) PCT No.: PCT/EP02/05993

§ 371 (c)(1), (2), (4) Date: Oct. 21, 2003

(87) PCT Pub. No.: WO02/096643

PCT Pub. Date: Dec. 5, 2002

(65) Prior Publication Data

US 2004/0126041 A1    Jul. 1, 2004

(30) Foreign Application Priority Data

May 31, 2001 (DE) .................. 101 26 463

(51) Int. Cl.
*F16C 33/20* (2006.01)
(52) U.S. Cl. ............... 384/276; 384/279; 384/297; 384/902; 384/908
(58) Field of Classification Search ........ 384/276, 384/279, 297, 300, 902, 908; 428/549–551, 428/566–568
See application file for complete search history.

(56) References Cited

U.S. PATENT DOCUMENTS

| 5,354,622 | A | * | 10/1994 | Nakamaru et al. ......... 428/551 |
| 5,750,221 | A | | 5/1998 | Scheckenbach |
| 6,548,188 | B1 | * | 4/2003 | Yanase et al. ............. 428/626 |

FOREIGN PATENT DOCUMENTS

| DE | 33 43 697 | * | 6/1984 |
| DE | 41 05 657 | * | 8/1991 |
| DE | 196 54 102 | | 6/1998 |
| DE | 197 28 131 | | 1/1999 |
| DE | 197 45 667 | | 4/1999 |
| DE | 693 27 377 | | 6/2000 |
| EP | 0 234 602 | * | 2/1987 |
| EP | 0 232 922 | * | 8/1987 |
| EP | 0 632 208 | | 1/1995 |

\* cited by examiner

*Primary Examiner*—William C. Joyce
(74) *Attorney, Agent, or Firm*—Paul Vincent

(57) ABSTRACT

A friction bearing composite material comprises a metal base layer, a porous support layer applied thereto, and a low friction layer made from PTFE forming a bearing surface for a bearing partner. The low friction material forming the sliding surface also fills the pores in the support layer and comprises at least 60 vol. % PTFE and 10-25 vol. % zinc sulphide. In order to achieve a high wear resistance with a low coefficient of friction, the low friction material further comprises 1.5-3.5 vol. % carbon fibers and 1-7 vol. % PFA.

15 Claims, 1 Drawing Sheet

FRICTION BEARING COMPOSITE MATERIAL WITH A METAL BASE LAYER

This application is the national stage of PCT/EP02/05993 filed on May 31, 2002 and also claims Paris Convention priority of DE 101 26 463.1 filed on May 31, 2001.

BACKGROUND OF THE INVENTION

The invention concerns a sliding bearing composite material with a metallic support layer, a porous carrier layer disposed thereon, and a sliding layer on the basis of PTFE which forms a sliding surface for a sliding partner, wherein the sliding layer material forming the sliding layer also fills the pores of the carrier layer and comprises at least 60 percent by volume of PTFE and 10-25 percent by volume of zinc sulfide.

A sliding bearing composite material of this type is disclosed e.g. in EP 0 232 922 B1. This document, however, does not mention a minimum content of 60 percent by volume of PTFE. For some length of time, the Assignee has produced a sliding bearing composite material which consists of 75 percent by volume of PTFE and 25 percent by volume of ZnS. This patent document also mentions that 5 to 40 percent by volume of aramide fibers, carbon fibers, glass fibers may be additionally contained as fillers.

EP 0 708 892 B1 discloses a sliding bearing composite material which does not disclose all of the elements upon which the invention constitutes an improvement, whose sliding layer material comprises PTFE and 2 to 20 percent by volume of fibrillated aramide fibers. In addition to PTFE, the embodiments also comprise PPS, PFA or calcium fluoride in various portions. This document does not give any further information.

WO 99/45285 discloses a sliding bearing composite material which does not disclose all of the features upon which the invention constitutes an improvement, whose sliding layer material should comprise PTFE, 10 to 30 percent by volume of a metal fluoride, in particular calcium fluoride and 2 to 10% fibrillated aramide fibers and 2 to 10% of a meltable fluoropolymer, FEP, PFA or MFA, wherein FEP is preferred. A specific embodiment is disclosed comprising 4 percent by volume of aramide fibers, 7 percent by volume of FEP, 18 percent by volume of CaF, the rest being PTFE.

WO 99/01679 discloses a sliding bearing composite material whose sliding bearing material comprises at least 60 percent by volume of PTFE, 15 to 25 percent by volume of a metallic filler, preferably lead, and in particular 8 to 12 percent by volume of PVDF and 1 to 3 percent by volume of carbon fibers oriented in a preferred direction. The use of metallic fillers, in particular lead, has become increasingly unacceptable.

DE 693 27 377 T2 discloses a sliding bearing composite material with a metallic support layer and porous carrier layer and a sliding layer, wherein the main component of the sliding layer material is PTFE. Moreover, zinc oxide whisker and magnesium oxysulfate are provided to improve the poor wear resistance of PTFE. In accordance with one embodiment variant, zinc sulfide is mentioned in addition to a large number of other available components.

DE 33 43 697 A1 also discloses a sliding bearing composite material with support layer and carrier layer and a sliding layer whose sliding layer material comprises a mixture of the following components: 0.1 to 50 percent by volume selected from one or more of solid lubricants such as metallic lubricants with low melting point for example Pb, Sn or alloys thereof, metal oxides, metal sulfides, metal fluorides, graphite or the like, and with fibrous materials such as carbon fibers and ceramics such as SiC; the rest being substantially PTFE, wherein the total amount of components, excluding PTFE, is within a range of 0.2 to 70 percent by volume.

EP 0 232 922 B1 discloses a sliding bearing composite material with 60 percent by volume PTFE, 20 percent by volume of glass fibers and 20 percent by volume of ZnS. This document further mentions that a polymer matrix material may contain glass fibers, glass balls, carbon fibers, ceramic fibers and aramide fibers individually or collectively in an amount of between 5 and 40 percent by volume, preferably 10 to 25 percent by volume.

EP 0 632 209 B1 also discloses a sliding bearing composite material with support layer, carrier layer and sliding layer, wherein the sliding layer material consists of PTFE, 50 to 30 percent by volume of metallic filler and 5 to 40 percent by volume of PVDF. The metallic filler is lead or zinc sulfide. A specific composition comprises 70 percent by volume of PTFE, 10 percent by volume of PVDF and 20 percent by volume of lead.

In view of the above, it is the underlying purpose of the present invention to produce a sliding bearing composite material of the above-mentioned type which has high wear resistance and yet a low coefficient of friction.

SUMMARY OF THE INVENTION

This object is achieved in accordance with the invention with a sliding bearing composite material of this type in that the sliding layer material further comprises 1.5-3.5 percent by volume of carbon fibers and 1-7 percent by volume of PFA.

The increase in wear resistance and maintenance of a low coefficient of friction thereby achieving tribologically suitable properties are, in practice, contradictory objectives. A sliding bearing composite material on the basis of PTFE only has e.g. an excellent coefficient of friction. However, the wear resistance is unsatisfactory and can be improved by adding fillers, e.g. metallic fillers. The metallic fillers improve heat dissipation thereby keeping the operating temperatures low to thereby increase the wear resistance.

Moreover, it is e.g. known—as mentioned above—to add fibrous fillers, in particular carbon fibers, to increase the coefficient of friction. A high carbon fiber portion, in particular 4 percent by volume and more, increases the wear resistance, however, severely impairs the coefficient of friction. Moreover, the addition of fibrous fillers has the disadvantage that the fibers cannot be easily held or anchored in the sliding layer material and represent potential fatigue spots. For this reason, the above-mentioned document WO 99/45285 proposes the use of so-called "fibrillated" aramide fibers whose bonding in the sliding layer material is improved due to their greatly enlarged surface.

The present invention has shown that optimum results are obtained when the carbon fiber portion does not exceed 3.5 percent by volume and when the sliding layer material additionally contains 1 to 7 percent by volume of PFA. It has turned out that especially PFA improves the bond of carbon fibers in the PTFE base material of the sliding layer forming the matrix. The invention has produced a sliding layer material which has satisfactory wear resistance with excellent bonding of the carbon fibers in the sliding layer material despite the relatively low carbon fiber portion of a maximum of 3.5 percent by volume, in particular, 1.5 to 3.5 percent by volume. This is thought to be due to the addition of PFA in the amount stated. Due to the (rather low) carbon fiber portion, the coefficient of friction of the inventive sliding layer material is improved.

In accordance with a preferred embodiment of the invention, the sliding layer material comprises 65 to 85 percent by volume of PTFE, in particular 70 to 77 percent by volume of PTFE.

In accordance with a further embodiment of the invention, the zinc sulfide portion is between 15 and 20 percent by volume.

The average grain size of the zinc sulfide particles used, measured in the centrifugal method according to DIN ISO 9001, is smaller than 1 μm, preferably between 0.2 and 0.5 μm. It has turned out that the addition of zinc sulfide supports separation and therefore homogeneous mixing of the carbon fibers with the other components. Under the microscope, one can see that the fine zinc sulfide particles deposit or adhere in a quasi wetting fashion on/to the surface of the carbon fibers. Moreover, one can see that the zinc sulfide enhances adherence of PFA particles to the surface of the carbon fibers, in particular when the grain size of the zinc sulfide particles is small. This improves binding and fixing of the carbon fibers in the matrix compound. The use of fine-grained zinc sulfide particles reduces the expansion tendency of the composite material during operation.

A further embodiment of the invention proposes a PFA portion of between 3 and 7 percent by volume.

Optimum properties of the sliding layer material in view of a maximum wear resistance and simultaneous good coefficient of friction are obtained with a carbon fiber portion of between 2.5 and 3.5 percent by volume.

Preferably, carbon fibers of a thickness of between 10 and 20 μm, in particular 10-16 μm, and particularly preferred 12-16 μm are used. The length of the carbon fibers is in particular 100-250 μm, preferably 100-200 μm and in particular 100-160 μm. If the fibers are too long, it is difficult to introduce the fibers into the pores of the carrier layer. If the fibers are too short, they do not contribute to the load stability and anchoring in the matrix material is impaired.

It has also turned out that the addition of 3 to 7 percent by volume, in particular 4 to 6 percent by volume, of $PPSO_2$ further improves the bond of the carbon fiber in the PTFE base material.

Further features, details and advantages of the invention can be extracted from the claims and the following description and drawing of a preferred embodiment of the inventive sliding bearing composite material.

BRIEF DESCRIPTION OF THE DRAWING

The figure illustrates a sliding bearing composite material in accordance with the invention.

DESCRIPTION OF THE PREFERRED EMBODIMENT

Figure 1:
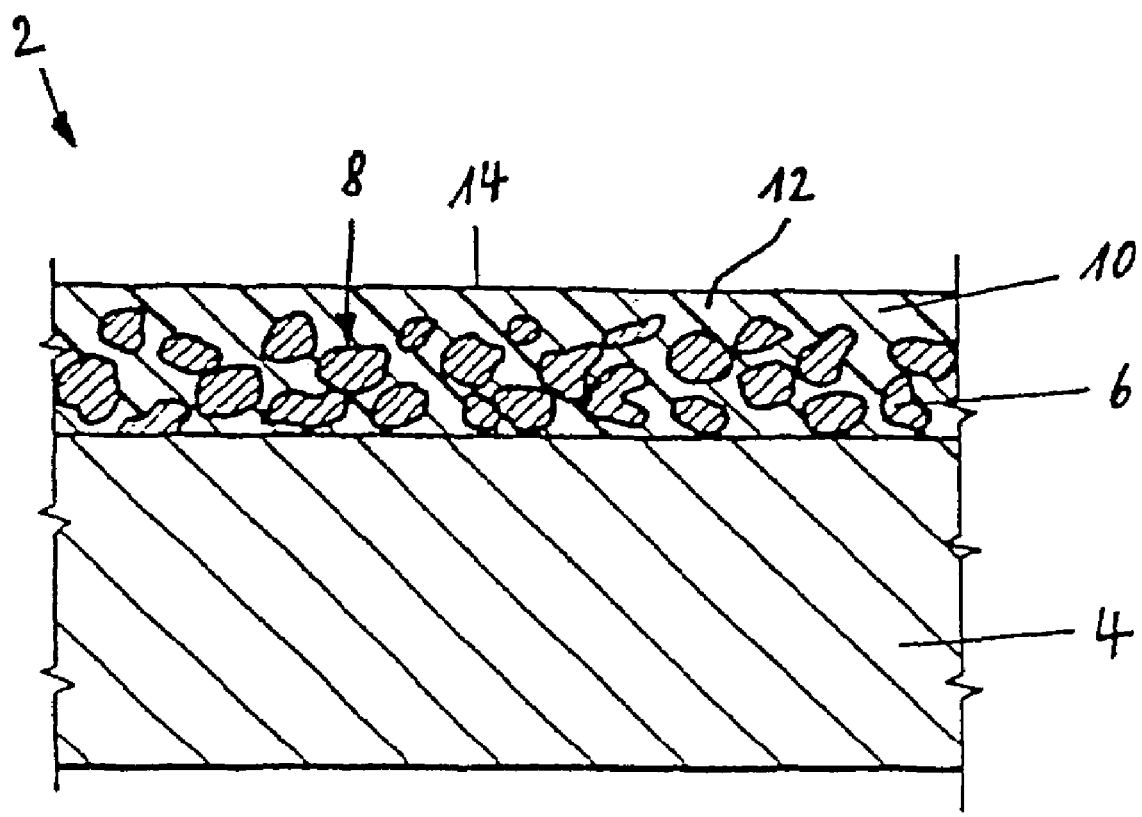

The sliding bearing composite material, generally referred to with reference numeral 2 in the figure, comprises a metallic support layer 4 of steel and a porous carrier layer 6 disposed thereon, preferably of a lead-free bronze layer, e.g. with 90 percent by weight of copper and 10 percent by weight of tin. A sliding layer material 10 is introduced into the pores of the carrier layer 6 on the upper side 8 of the carrier layer 6 opposite to the support layer 4. The sliding layer material 10 projects slightly past the upper side 8 of the carrier layer 6 and forms a sliding layer 12 with a sliding surface 14 for a sliding partner (not shown). The sliding layer material 10 has a PTFE matrix with at least 60 percent by volume of PTFE and 10 to 25 percent by volume of zinc sulfide and, in accordance with the invention, 1.5 to 3.5 percent by volume of carbon fibers and 1 to 7 percent by volume of PFA.

A preferred composition of the sliding layer material comprises 65 to 85 percent by volume of PTFE forming the matrix, 10 to 25 percent by volume of ZnS, 3 to 7 percent by volume of PFA and 1.5 to 3.5 percent by volume of carbon fibers. The sliding layer material preferably consists of the above-mentioned components. A preferred exemplary composition contains 74 percent by volume of PTFE, 18 percent by volume of ZnS, 5 percent by volume of PFA and 3 percent by volume of carbon fibers.

A further preferred composition of the sliding layer material comprises 60 to 80 percent by volume of PTFE, 10 to 25 percent by volume of ZnS, 3 to 7 percent by volume of PFA, 1.5 to 3.5 percent by volume of carbon fibers and 3 to 7 percent by volume of $PPSO_2$. The sliding layer material consists preferably of the above-mentioned components. A preferred exemplary composition contains 69 percent by volume of PTFE forming a matrix, 18 percent by volume of ZnS, 5 percent by volume of PFA, 3 percent by volume of carbon fibers and 5 percent by volume of $PPSO_2$.

We claim:

1. A sliding bearing composite material for use with a sliding partner, the material comprising:
   a metallic support layer;
   a porous carrier layer disposed on said support layer; and
   a sliding layer forming a sliding surface for the sliding partner, said sliding layer disposed on said carrier layer to fill pores in said carrier layer, said sliding layer containing at least 60 percent by volume of PTFE, 10 to 25 percent by volume of zinc sulfide, 1.5 to 3.5 percent by volume of carbon fibers, and 1 to 7 percent by volume of PFA.

2. The sliding bearing composite material of claim 1, wherein said sliding layer material comprises 65 to 85 percent by volume of PTFE.

3. The sliding bearing composite material of claim 2, wherein said sliding layer material comprises 70 to 77 percent by volume of PTFE.

4. The sliding bearing composite material of claim 1, wherein said sliding layer material comprises 15 to 20 percent by volume of zinc sulfide.

5. The sliding bearing composite material of claim 1, wherein said zinc sulfide comprises zinc sulfide particles of an average grain size of <1 μm.

6. The sliding bearing composite material of claim 5, wherein said zinc sulfide particles have an average grain size of 0.2 to 0.5 μm.

7. The sliding bearing composite material of claim 1, wherein said sliding layer material comprises 3 to 7 percent by volume of PFA.

8. The sliding bearing composite material of claim 1, wherein said sliding layer material comprises 2.5 to 3.5 percent by volume of carbon fibers.

9. The sliding bearing composite material of claim 1, wherein said sliding layer material further comprises 3 to 7 percent by volume of $PPSO_2$.

10. The sliding bearing composite material of claim 9, wherein said sliding layer material comprises 4 to 6 percent by volume of $PPSO_2$.

11. The sliding bearing composite material of claim 1, wherein said carbon fibers have a thickness of 10 to 20 μm.

12. The sliding bearing composite material of claim 11, wherein said carbon fibers have a thickness of 10 to 16 μm.

13. The sliding bearing composite material of claim 1, wherein said carbon fibers have a length of 100 to 250 μm.

14. The sliding bearing composite material of claim 13, wherein said carbon fibers have a length of 100 to 200 μm.

15. The sliding bearing composite material of claim 14, wherein said carbon fibers have a length of 100 to 160 μm.

* * * * *